US012522251B2

(12) United States Patent
Reyss

(10) Patent No.: US 12,522,251 B2
(45) Date of Patent: Jan. 13, 2026

(54) DEVICE FOR SELECTING THE DRIVING MODE OF AN AUTONOMOUS MOTOR VEHICLE

(71) Applicants: RENAULT S.A.S, Boulogne Billancourt (FR); NISSAN MOTOR CO., LTD., Yokohama (JP)

(72) Inventor: Bertrand Reyss, Guyancourt (FR)

(73) Assignees: AMPERE S.A.S., Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 265 days.

(21) Appl. No.: 18/557,820

(22) PCT Filed: Apr. 28, 2022

(86) PCT No.: PCT/EP2022/061413

§ 371 (c)(1),
(2) Date: Oct. 27, 2023

(87) PCT Pub. No.: WO2022/229352

PCT Pub. Date: Nov. 3, 2022

(65) Prior Publication Data

US 2024/0253669 A1 Aug. 1, 2024

(30) Foreign Application Priority Data

Apr. 29, 2021 (FR) ....................................... 2104499

(51) Int. Cl.
*B60W 60/00* (2020.01)
*B62D 1/04* (2006.01)

(52) U.S. Cl.
CPC ........... *B60W 60/005* (2020.02); *B62D 1/046* (2013.01)

(58) Field of Classification Search
CPC ............................. B60W 60/005; B62D 1/046
See application file for complete search history.

(56) References Cited

U.S. PATENT DOCUMENTS

| | | | | |
|---|---|---|---|---|
| 9,580,080 B1 * | 2/2017 | Letwin | ................ | B60W 50/082 |
| 2018/0017969 A1 | 1/2018 | Nagy et al. | | |
| 2020/0298888 A1 * | 9/2020 | Ozeki | ................ | H01M 10/443 |

FOREIGN PATENT DOCUMENTS

| | | |
|---|---|---|
| EP | 3 240 712 B1 | 12/2018 |
| FR | 3 022 637 A1 | 12/2015 |

OTHER PUBLICATIONS

International Search Report mailed on Aug. 24, 2022 in PCT/EP2022/061413 filed on Apr. 28, 2022 (2 pages).
French Search Report Issued Nov. 19, 2021, in FR Application 2104499, filed on Apr. 29, 2021, 9 pages (with Written Opinion & English Translation of Categories of Cited Documents).

* cited by examiner

*Primary Examiner* — Stephanie E Bloss
*Assistant Examiner* — Michael A Harrison
(74) *Attorney, Agent, or Firm* — Oblon, McClelland, Maier & Neustadt, L.L.P.

(57) ABSTRACT

A device for selecting the driving mode of an autonomous motor vehicle includes an electrical assembly in which a switch is associated in series with a first resistor. A safety resistor is connected in parallel with the switch and with the associated first resistor. The electrical assembly is connected firstly to a DC voltage source of a computer and secondly to a ground of the computer such that the equivalent resistance of the electrical assembly makes it possible to determine firstly whether the switch is closed or open and secondly a potential fault with the electrical assembly.

9 Claims, 2 Drawing Sheets

DEVICE FOR SELECTING THE DRIVING MODE OF AN AUTONOMOUS MOTOR VEHICLE

Figure 1:
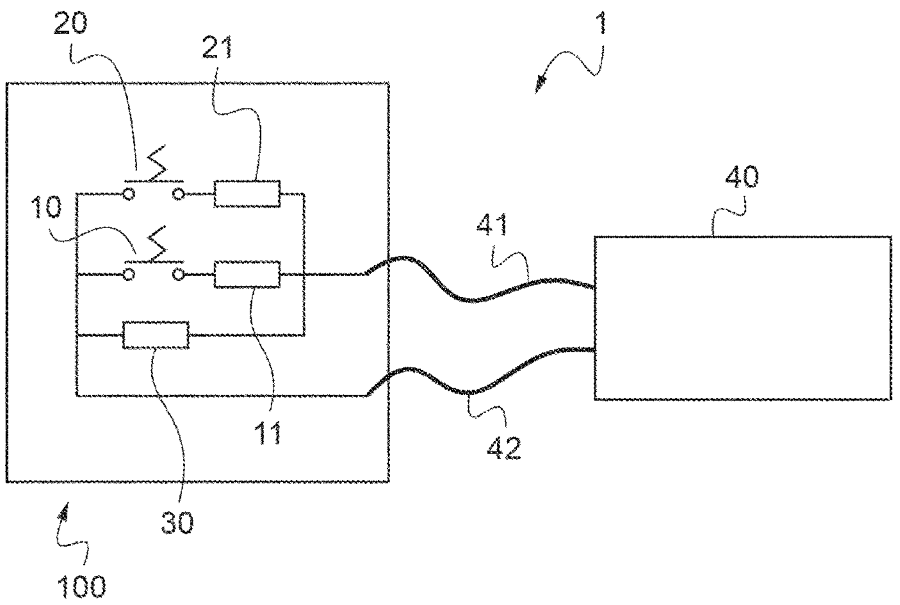

The invention relates to a device for acquiring control of an autonomous vehicle, in particular a device for selecting the driving mode of an autonomous motor vehicle.

In the field of motor vehicles, autonomous vehicles are vehicles which are able to move and steer automatically without the assistance of the driver. In other words, an autonomous vehicle is driven by an on-board computer, taking the control decisions depending on external sensors such as radars and lidars, depending on its dynamics obtained by sensors such as accelerometers and gyroscopes, depending on the knowledge of the road obtained by on-board mapping means, and depending on its geographical position obtained, for example, by GPS.

An autonomous vehicle must, however, have the ability to be driven by a human driver. Thus, the driver must have the option of triggering automatic steering or of taking back control.

For this purpose, it necessary for a control interface to be able to make it possible for the driver to decide manually whether they wish to enter or exit the autonomous mode at any moment.

Given that this command has major safety importance, it is necessary to optimally secure the transmission of the command to activate or deactivate the autonomous mode.

The document EP3240712B1 is notably known, which describes a circuit diagram of a control system for activating or deactivating the autonomous mode which comprises an electronic controller activating the autonomous driving mode when a first button and a second button are selected at once for more than a predetermined first time, thus avoiding the autonomous driving mode being activated or deactivated involuntarily.

However, the solution proposed by this document, with two switches, does not make it possible to detect a possible failure of this control system.

Thus, there is a need for an improved control system which is able to automatically detect a possible failure of the electronic control circuit for entering or exiting the autonomous driving mode.

For this purpose, a device for selecting the driving mode of an autonomous motor vehicle is proposed, comprising at least one control switch, the device comprising a computer which is able to detect the pressing of said switch.

The device includes an electrical circuit in which said switch is connected in series to a first resistor, a safety resistor being connected in parallel with said switch and with said first resistor, said electrical circuit being connected, on the one hand, to a DC voltage source of the computer and, on the other hand, to a ground of the computer, so that the equivalent resistance of the electrical circuit makes it possible to determine, on the one hand, whether the switch is closed or open and, on the other hand, a potential failure of said electrical circuit.

Thus, the presence of the safety resistor provides optimized safety in order to ensure that the computer is able to detect a failure of the device for selecting the driving mode.

Advantageously and non-limitingly, said electrical circuit comprises a second switch connected in series with a second resistor, said second switch and said second resistor being connected, on the one hand, in parallel with the first switch and with the first resistor and, on the other hand, in parallel with said safety resistor, so that the equivalent resistance of the electrical circuit further makes it possible to determine whether the second switch is closed or open, simultaneously or not with the first switch. Thus, the device is suited to operating with two switches, which makes it possible to obtain increased safety in the change of driving mode.

Furthermore, such a circuit with two switches has only two connections to the computer: the connection to the ground and the DC voltage connection, making it possible for the computer to measure the equivalent resistance. Thus, the risks of electrical failures, notably the risks of severed cables, are reduced with respect to the prior art, where there were twice as many cables for connection to the computer.

Advantageously, the device comprises means making it possible, when the equivalent resistance is equal to the value of said safety resistor, to detect that the two switches are open. Thus, by measuring the equivalent resistance seen from the computer, it is possible to determine in a simple manner whether the switches are both open.

Advantageously, the device comprises means making it possible, when said equivalent resistance is equal to an infinite value, to detect a failure linked to an open circuit. Thus, by measuring the equivalent resistance seen from the computer, it is possible to determine in a simple manner whether there is an open-circuit failure in the electrical circuit.

Advantageously, the device comprises means making it possible, when the equivalent resistance is zero, to detect a short circuit at the ground or at the DC voltage source. Thus, by measuring the equivalent resistance seen from the computer, it is possible to determine in a simple manner whether the device is shorted.

The invention also relates to a computer on board an autonomous motor vehicle, which is suited to detecting, depending on a measured resistance value, whether the connected selection device is a selection device comprising a single switch, or whether the connected selection device is a selection device comprising two switches.

The invention also relates to a steering wheel for a motor vehicle comprising an on-board computer and a selection device as described above.

The invention also relates to a motor vehicle comprising a steering wheel as described above.

Figure 2:
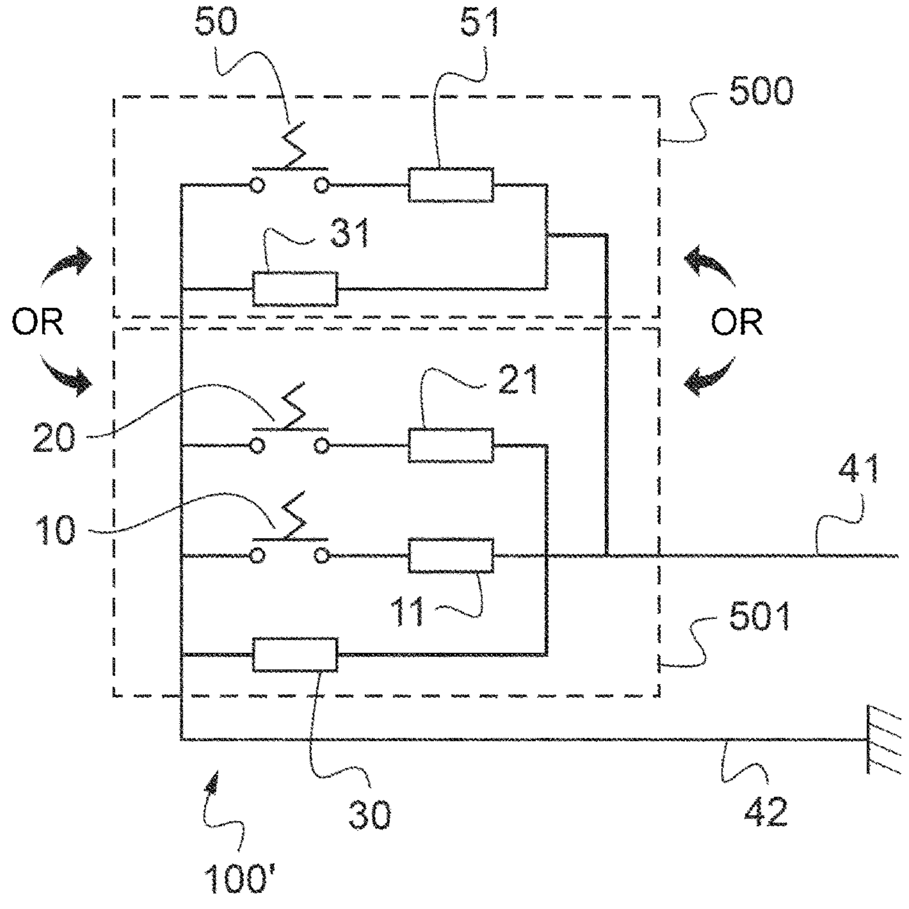

Other particularities and advantages of the invention will emerge upon reading the description given below of particular embodiments of the invention, which are given indicatively but non-limitingly, with reference to the appended drawings, in which:

FIG. 1 is a schematic view of an arrangement according to a first embodiment of the invention; and FIG. 2 is a representation of two alternative electrical circuits of a device according to a second embodiment of the invention.

With reference to FIG. 1, according to a first embodiment of the invention, an autonomous motor vehicle comprises a steering wheel having means for selecting the driving mode, making it possible to trigger autonomous driving, or deactivating autonomous driving.

These selection means comprise two switches 10, 20, each installed on the steering wheel so as for one of them to be able to be activated by the left hand of the driver and the other by the right hand of the driver.

When the two switches are pressed simultaneously for a predetermined time, for example 1 to 3 seconds, then an on-board computer, which is integrated into the steering wheel, detects a command to change the state of the driving mode.

Consequently, when the two switches 10, 20 are kept closed for the predetermined time, if the current driving mode was the autonomous mode, then the vehicle switches to manual driving mode, and vice versa.

When the two switches 10, 20 are released, or when only one of the switches is released, then the selector is in a rest position, indicating that no action to change the driving mode is requested by the driver.

The selection device 1 has an electrical circuit 100 in which a first switch 10 is connected in series with a first resistor 11, also labeled Rsw1, forming a first branch of the circuit.

The second switch 20 is connected in series with a second resistor 21, also labeled Rsw2, forming a second branch of the circuit 100.

The first branch and the second branch are in parallel with one another.

Finally, a safety resistor 30, also labeled $R_{AD}$, is mounted in parallel with the first and second branches.

This circuit is connected, on the one hand, to the ground 42 of the on-board computer 40 and, on the other hand, to a DC voltage 41, also labeled $V_{BAT}$, of the computer 40.

In this embodiment the DC voltage has a value of 5 V.

Thus, seen from the computer, an equivalent resistance Re of this circuit may be calculated in the form:

$$Re = \frac{1}{\frac{1}{R_{sw1}} + \frac{1}{R_{sw2}} + \frac{1}{R_{AD}}} \quad \text{[Math 1]}$$

This equivalent resistance value Re thus makes it possible for the computer to determine, on the one hand, what the states of the two switches are and further makes it possible to detect a possible failure of the circuit 100.

In this example the following resistance values are taken:

$$R_{SW1} = 560\Omega$$

$$R_{SW2} = 560\Omega$$

$$R_{AD} = 6.8\ k\Omega$$

By calculating the equivalent resistance Re, seen from the computer, with these predetermined resistance values, the computer 40 is able to determine the state of the circuit according to the following table:

TABLE 1

| Actual state of the circuit | Equivalent resistance value Re | State detected by the computer depending on Re |
|---|---|---|
| Short circuit DC voltage Vbat | 0 Ω | Autonomous mode error short circuit |
| Open circuit | ∞ | Autonomous mode error open circuit |
| Switches open | 6.8 kΩ | Change of driving mode not triggered |
| First switch open and second switch closed | 517 Ω | Autonomous mode error, selection incomplete |
| Second switch open and first switch closed | 517 Ω | Autonomous mode error, selection incomplete |
| Both switches closed | 269 Ω | Change of driving mode triggered |
| Short circuit at the ground | 0 Ω | Autonomous mode error short circuit |

It is understood from this table that the circuit according to the invention and the chosen resistance values, in which, in particular, the safety resistor $R_{AD}$ has a value at least 10 times greater than the first and second resistors, makes it possible for the computer to determine, depending on the equivalent resistance Re, the state of the electrical circuit 100 and notably possible short-circuit or open-circuit failures in the circuit 100.

According to one particular implementation of this embodiment, the first resistor and the second resistor may also have distinct values so that the computer is able to determine which is the closed switch when only one switch is detected as closed.

According to a second embodiment of the invention, with reference to FIG. 2, it happens that a single computer 41 is mounted on various models of motor vehicle.

Thus, for example, the same computer may be implemented for an urban model of a motor vehicle and for a sports model of a motor vehicle.

In this case, there may be differences, including the manual change of driving mode. Here, for the sports model the change from autonomous driving mode is manually controlled by a single switch 50, while for the urban model it is controlled by the simultaneous pressing of two switches 10, 20 as disclosed in the first embodiment.

The diagram of FIG. 2 is a view superposing two different circuits 100' which are not present at the same time in the same vehicle; only the upper circuit 500 or the lower circuit 501 is present in a vehicle.

Thus, by way of example the sports model comprises the upper circuit 500 with a single switch 50, while the urban model comprises the lower circuit 501, which is identical to the first embodiment of the invention.

The objective is to make it possible for the computer to detect, on the one hand, which circuit is present and, on the other hand, to detect a command to change driving mode and possible failures in the electrical circuit.

For this purpose, the upper circuit 500 has a single switch 50 and a resistor 51, also labelled Rsw3, in series with the switch 50. The upper circuit 500 also comprises a safety resistor 31 in parallel with the switch 50 and with the resistor 51.

This upper circuit 500 is connected to the computer 50, on the one hand to the ground of the computer 42 and on the other hand to a DC voltage source $V_{BAT}$, for example at 5 V, of the computer 41.

In this upper circuit 500, the resistors have the following values:

The safety resistor $R_{RS}$=2.7 kΩ the resistor 51 Rsw3=1.5 kΩ.

The lower circuit 501 is, for its part, identical to the first embodiment and the resistance values are the same as for this first embodiment.

Thus, seen from the computer 40, measuring the equivalent resistance Re makes it possible to detect the various states:

TABLE 2

| Actual state of the circuit | Equivalent resistance Re | Circuit detected | State detected by the computer depending on Re |
|---|---|---|---|
| Short circuit DC voltage $V_{BAT}$ | 0 Ω | Either | Autonomous mode error - short circuit |
| Open circuit | ∞ | Either | Autonomous mode error - open |

TABLE 2-continued

| Actual state of the circuit | Equivalent resistance Re | Circuit detected | State detected by the computer depending on Re |
|---|---|---|---|
| | | | circuit |
| Switches open | 6.8 kΩ | Lower circuit | Selection of change of driving mode not triggered |
| First switch open and second switch closed | 517 Ω | Lower circuit | Autonomous mode error, selection incomplete |
| Second switch open and first switch closed | 517 Ω | Lower circuit | Autonomous mode error, selection incomplete |
| Both switches closed | 269 Ω | Lower circuit | Change of driving mode triggered |
| Short circuit at the ground | 0 Ω | Either | Autonomous mode error - short circuit |
| RS contact closed | 2.7 kΩ | Upper circuit | Change of driving mode not triggered |
| RS closed | 965 Ω | Upper circuit | Selection of change of driving mode triggered |

Thus, it is understood that the computer 40, even when previously ignorant of which circuit is integrated into the vehicle, may determine, on the one hand, which circuit is installed in the motor vehicles, which switches are closed, and possible short-circuit or open-circuit failures in the circuit.

Thus, it is understood from the invention that the particular choice of the resistance values, where:

the safety resistors are greater than the resistors associated with the switches, for example between 5 and 20 times greater, and the safety resistors of a first circuit mode and of a second circuit are different from one another, for example, having resistance values having a ratio ranging from 2 to 4, makes it possible for the computer to automatically detect which electrical circuit is present in the steering wheel and ensure optimal safety of the selection of the driving mode by automatically detecting the main failures in the electrical circuit.

The invention claimed is:

1. A device for selecting a driving mode of an autonomous motor vehicle, comprising:

at least one control switch;

a computer configured to detect pressing of said switch;

an electrical circuit in which said switch is connected in series to a first resistor, a safety resistor being connected in parallel with said switch and with said first resistor, said electrical circuit being connected to a DC voltage source of the computer and to a ground of the computer so that an equivalent resistance of the electrical circuit makes it possible to determine whether the switch is closed or open and a potential failure of said electrical circuit.

2. The selection device as claimed in claim 1, wherein said electrical circuit comprises a second switch connected in series with a second resistor, said second switch and said second resistor being connected in parallel with the first switch and with the first resistor and in parallel with said safety resistor so that the equivalent resistance of the electrical circuit makes it possible to determine whether the second switch is closed or open simultaneously with the first switch.

3. The selection device as claimed in claim 1, wherein said electrical circuit comprises a second switch connected in series with a second resistor, said second switch and said second resistor being connected in parallel with the first switch and with the first resistor and in parallel with said safety resistor so that the equivalent resistance of the electrical circuit makes it possible to determine whether the second switch is closed or open.

4. The selection device as claimed in claim 3, further comprising means for detecting, when the equivalent resistance is equal to the value of said safety resistor, that the first and second switches are open.

5. The selection device as claimed in claim 1, further comprising means for detecting, when said equivalent resistance is equal to an infinite value, a failure linked to an open circuit.

6. The selection device as claimed in claim 1, further comprising means for detecting, when the equivalent resistance is zero, a short circuit at the ground or at the DC voltage source.

7. The selection device as claimed in claim 1, wherein the computer is configured to detect whether the switch is a single switch or whether the selection device comprises two switches.

8. A steering wheel for a motor vehicle comprising:

the selection device as claimed in claim 1.

9. A motor vehicle comprising:

the steering wheel as claimed in claim 8.

* * * * *